E. E. ROSE.
ELECTRIC SOLDERING IRON.
APPLICATION FILED APR. 10. 1911.
1,075,497.
Patented Oct. 14, 1913.
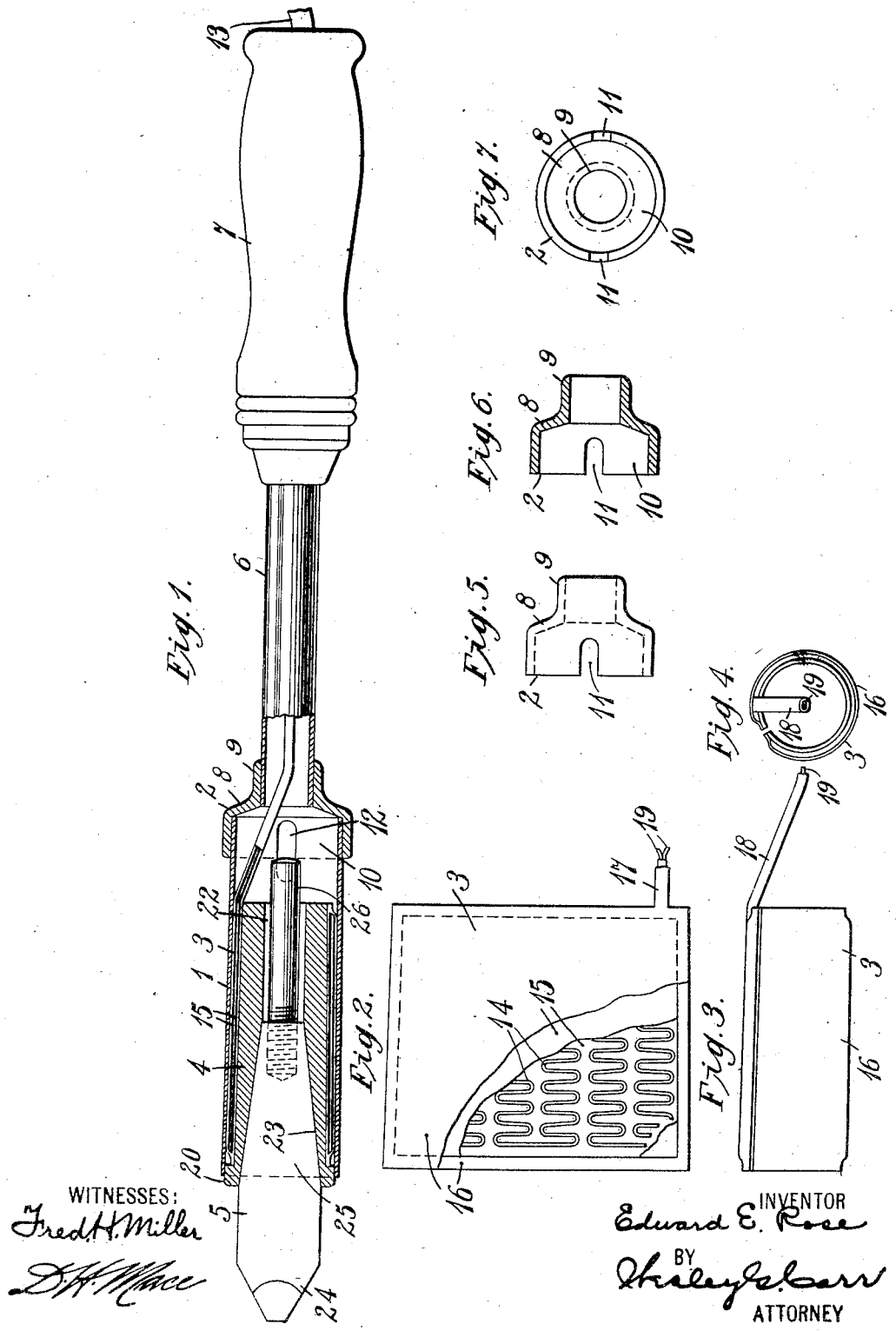
WITNESSES:
Fred H. Miller
D. H. Mace
INVENTOR
Edward E. Rose
BY
Hsley J. Carr
ATTORNEY

UNITED STATES PATENT OFFICE.

EDWARD E. ROSE, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRIC SOLDERING-IRON.

1,075,497.   Specification of Letters Patent.   Patented Oct. 14, 1913.

Application filed April 10, 1911.   Serial No. 620,174.

*To all whom it may concern:*

Be it known that I, EDWARD E. ROSE, a citizen of the United States, and a resident of Pittsburgh, in the county of Allegheny and State of Pennsylvania, have invented a new and useful Improvement in Electric Soldering-Irons, of which the following is a specification.

My invention relates to electric soldering irons, and it has for its object to provide a device of this character which shall be simple and durable in construction and effective in operation, and that shall embody means whereby the heat generated in its heater unit may be efficiently conducted and imparted to a removable soldering tip.

My invention may best be understood by reference to the accompanying drawing, in which—

Figure 1 is a view, partially in section and partially in side elevation, of a device constructed in accordance with my invention. Fig. 2 is a detail view of the heater shown in Fig. 1, in a preliminary stage of its construction. Figs. 3 and 4 are, respectively, a side elevation and an end view of the heater shown in Fig. 1, and Figs. 5, 6 and 7 are detail views of the reducing bushing shown in Fig. 1.

Referring to the accompanying drawing, the device here shown comprises a receiving member or holder 1, a reducing bushing 2, a heater unit 3, a tapered sleeve 4, a soldering tip 5, a tubular shaft 6 and an insulating handle 7.

The receiving member 1 is substantially tubular in form and is tapered slightly toward its inner end to receive the heater unit 3, as will be hereinafter set forth.

The reducing bushing 2 comprises a body portion 8 and a neck portion 9. The body portion 8 is provided with a large centrally-located recess 10 and longitudinally-disposed slots or key-ways 11 which register with similar slots 12 in the receiving member 1 for a purpose to be hereinafter described.

The inner end of the receiving member 1 fits tightly into the recess 10 in the reducing bushing 2, said members being rigidly secured together by a fusing or welding process or otherwise.

One end of the tubular shaft member 6 fits within the neck portion 9 of the reducing member 2 and is rigidly secured thereto in a suitable manner, while the other end of the tubular shaft is provided with the insulating handle 7 which envelops a suitable terminal member (not shown) to which the external connections to a multi-conductor service cable 13 are made in the usual manner.

The heater unit 3 is substantially tubular in form and may be of any suitable construction, although I prefer a unit which comprises a plurality of rows of resistance wire 14 of the zig-zag type which is disposed between layers of insulating material 15 and suitable sheet metal plates 16. Having assembled the component parts of the heater unit as described, they are subjected to a considerable pressure, and the outer edges of the plates 16 are fused or welded together in a well-known manner, thereby providing a self-contained and durable unit. Furthermore, each side plate 16 is provided with a relatively narrow projecting portion 17, in order to form a protecting sheath 18 for a plurality of heater unit leads 19. After the heater unit 3 is in the form shown in Fig. 2, it is fashioned into its final tubular form, as shown in Figs. 1, 3 and 4.

The sleeve member 4 is of good heat-conducting material and is disposed within the heater unit 3, the outer surface thereof being tapered slightly toward its inner end to conform to the taper of the outer receiving member 1. The outer end of the sleeve member 4 is provided with an enlarged portion 20 which abuts against the end of the heater unit 3 and is fitted tightly within the outer end of the receiving member 1. The inner portion of the tapered sleeve member 4 is provided with a centrally-located cylindrical recess 22, while the outer portion thereof embodies a relatively large and tapered recess 23 which communicates with the recess 22 and is adapted to receive the soldering tip 5.

The soldering tip 5 comprises a working portion 24 and a shank or body portion 25 which is tapered toward its inner end to correspond to the taper of the recess 23. The inner end of the shank portion 25 is provided with an extension or rod 26 that projects through the cylindrical recess 22 into coöperative relationship with the slot or key-way 11.

In assembling the working elements 3, 4 and 5, the heater unit 3 is first inserted into the tapered receiving member 1, after which the tapered sleeve member 4 is driven into position, thereby securely fastening the heater 3 and producing a considerable pressure thereon, as well as effecting an intimate contact therewith, as will be readily understood. The protected heater unit leads 19 are suitably insulated from each other and are conducted through the reducing bushing 2 and the tubular shaft 6 to the terminal member (not shown) to which they are connected.

In most cases, it is rarely necessary to remove the heater unit 3 and it may be found preferable to permanently secure the sleeve member 4 in position by fusing or welding its outer end 20 to the receiving member 1. By so doing, the acid fumes which are incident to a soldering process are excluded from the heater unit 3 and the usual consequent deterioration is prevented. The soldering tip 5 may then be forced into position, the projecting rod 26 thereof extending into coöperative relationship with the slot or key-way 11 so that the tip 5 may be readily removed by the insertion of a suitable wedge or key (not shown) into the key-way 11.

In some classes of work, it is desirable to change the size of soldering tips at frequent intervals, and, therefore, it becomes expedient to provide a considerable taper upon the soldering tip 5 and its coöperative recess 23, in order that the tip may be readily released and withdrawn. Inasmuch as frequent removals of the soldering tip are liable to cause the end of the rod 26 to become mutilated and battered, it will probably be found desirable to construct the same of steel, although I do not wish to be restricted in this respect.

Such modifications in the structural details and in the arrangement and location of parts as may be made by those skilled in the art without materially changing the mode of operation or the result are to be understood as included within the spirit and scope of my invention.

I claim as my invention:

1. An electric soldering iron comprising a receptacle, a heater unit disposed therein as a lining, a tubular member for securing said heater unit in position and maintaining a pressure thereon, and a removable soldering tip having a tapered end seated in a correspondingly tapered socket in said tubular member and frictionally held therein.

2. An electric soldering iron comprising a holder having a tapered recess therein, a thin heater unit constituting a lining for said recess, a tubular member located within said heater unit under compression and having a tapered interior, and a soldering tip frictionally held in said interior.

3. In an electric soldering iron, the combination with a supporting member having a tapered receiving chamber, and a tubular heater unit fitted therein, of a tapered sleeve of good conducting material located within said heater and making intimate contact therewith, and a removable soldering tip frictionally secured within said tapered sleeve.

4. In a soldering iron, the combination with a tapered receptacle, a tubular heater disposed therein, and a tapered sleeve member located within said heater and exerting pressure thereon, of a removable plug tip having a greater taper than said sleeve member and frictionally held within said sleeve member.

5. In an electric soldering iron, the combination with a supporting member having a tapered receiving chamber and a transverse key-way at the base thereof, a thin incased heater unit disposed in said chamber as a lining therefor, and a tapered sleeve member fitted within said heater unit to effect a considerable pressure thereon, said sleeve member being permanently secured to said supporting member and provided with a centrally disposed tapered recess, of a soldering tip frictionally held in said recess and having a portion which projects through said recess into coöperative relationship with said transverse key-way.

6. A soldering iron comprising a tapered receiving member having a transverse key-way therethrough, a tubular heater disposed therein, a tapered sleeve member located within said heater and having a centrally disposed recess of greater taper than the outer portion thereof, a soldering tip having a taper to conform to that of said recess and held frictionally therein, and a shank or rod of relatively hard material projecting from said soldering tip through said sleeve member into coöperative relationship with the said transverse key-way.

In testimony whereof, I have hereunto subscribed my name this 30th day of March, 1911.

EDWARD E. ROSE.

Witnesses:
RUDOLPH A. BOLZE,
B. B. HINES.

Copies of this patent may be obtained for five cents each, by addressing the "Commissioner of Patents. Washington, D. C."